United States Patent [19]
Shimasaki et al.

[11] Patent Number: 5,415,035
[45] Date of Patent: May 16, 1995

[54] COMBUSTION STATE-DETECTING SYSTEM FOR INTERNAL COMBUSTION ENGINES

[75] Inventors: Yuichi Shimasaki; Kazutomo Sawamura; Kenichi Maeda; Shigetaka Kuroda, all of Wako, Japan

[73] Assignee: Honda Giken Kogyo Kabushiki Kaisha, Tokyo, Japan

[21] Appl. No.: 118,679

[22] Filed: Sep. 10, 1993

[30] Foreign Application Priority Data

Sep. 11, 1992 [JP] Japan ................... 4-269325

[51] Int. Cl.⁶ .................... F02D 45/00; G01M 15/00
[52] U.S. Cl. ................................................ 73/117.3
[58] Field of Search ............... 73/116, 117.2, 117.3; 364/431.08

[56] References Cited

U.S. PATENT DOCUMENTS

| | | | |
|---|---|---|---|
| 4,337,647 | 7/1982 | Radcliffe et al. | 73/116 |
| 5,041,980 | 8/1991 | Maddock et al. | 73/116 |
| 5,044,195 | 9/1991 | James et al. | 73/117.3 |
| 5,095,742 | 3/1992 | James et al. | 73/116 |
| 5,237,862 | 8/1993 | Mangrulkar et al. | 73/116 |
| 5,263,364 | 11/1993 | Nakayama et al. | 73/116 |
| 5,307,671 | 5/1994 | Akase | 73/117.3 |
| 5,309,756 | 5/1994 | Osawa et al. | 73/116 |

FOREIGN PATENT DOCUMENTS 3-286166 12/1991 Japan.

Primary Examiner—Richard E. Chilcot, Jr.
Assistant Examiner—George M. Dombroske
Attorney, Agent, or Firm—Nikaido, Marmelstein, Murray & Oram

[57] ABSTRACT

A combustion state-detecting system, for internal combustion engines, has a crank angle sensor. The crank angle sensor generates a crank angle signal with a predetermined period shorter than a firing period of the engine whenever the crankshaft rotates through a predetermined angle. A value of the rotational speed of the engine is detected whenever the crank angle signal is generated. A first average value of the detected engine rotational speed is calculated over a period of one rotation of the crankshaft, followed by calculating a second average value of the first average value over every firing period, to thereby calculate a rate of variation in the second average value over every firing period. The rate of variation is compared with a predetermined value, to determine whether or not the engine is in a degraded state of combustion.

6 Claims, 7 Drawing Sheets

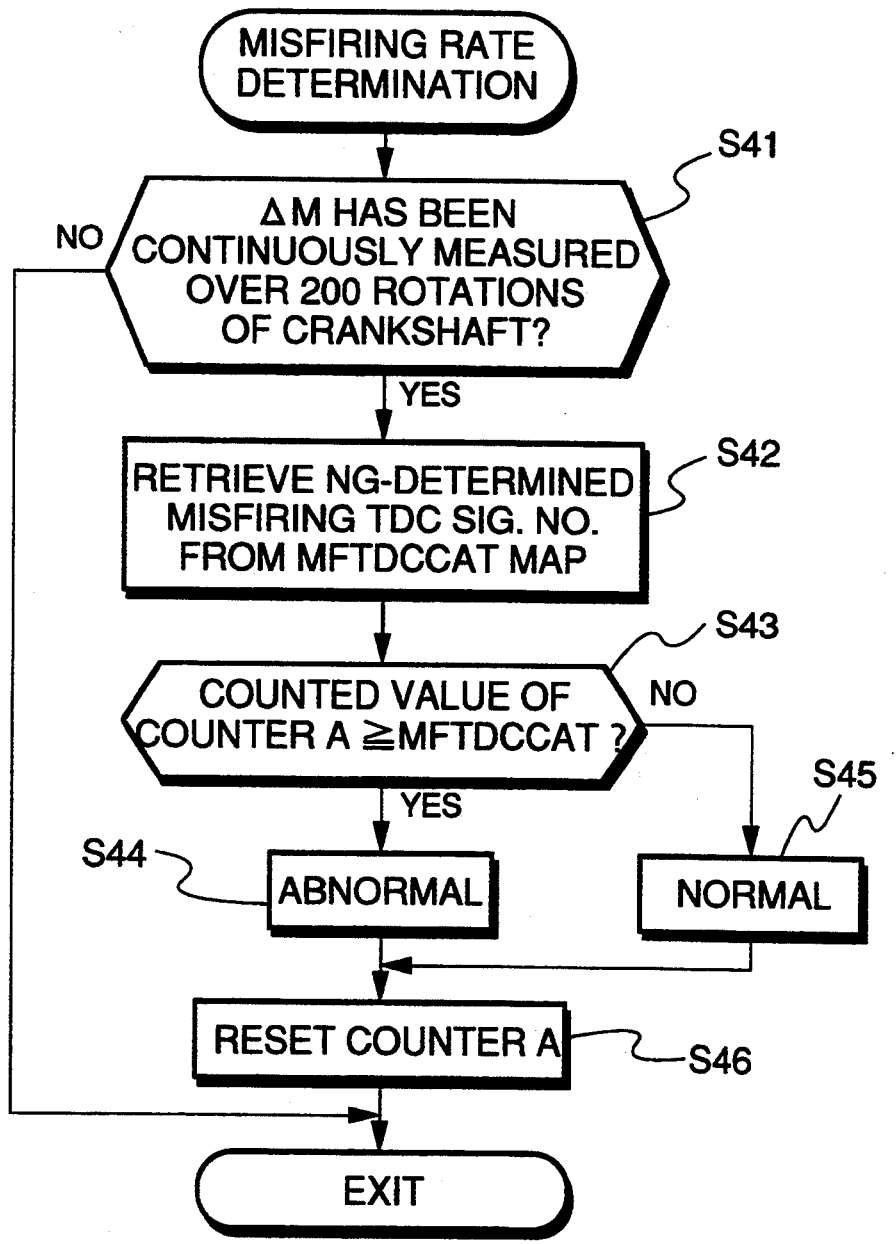

COMBUSTION STATE-DETECTING SYSTEM FOR INTERNAL COMBUSTION ENGINES

BACKGROUND OF THE INVENTION

1. Field of the Invention

This invention relates to a combustion state-detecting system for detecting a state of combustion (misfiring) in internal combustion engines, based upon a variation in the angular velocity of the crankshaft during rotation of the engine in every combustion cycle.

2. Prior Art

To detect a cylinder of an internal combustion engine in which normal combustion does not take place due to failure in the ignition system, the fuel supply system or the like, there is conventionally known an abnormality-detecting system which detects a rate of variation in the angular velocity of the crankshaft during rotation of the engine in every combustion cycle, to thereby determine whether or not an abnormality has occurred in any of the cylinders, based upon the detected rate of variation, as proposed, for example, by Japanese Provisional Patent Publication (Kokai) No. 3-286166.

According to the above conventional system, an output from a crank angle sensor provided at the crankshaft is directly supplied to the abnormality-detecting system, and the pulse repetition period of the sensor output is measured to detect the rotational speed of the crankshaft. However, in actuality the output from the crank angle sensor always varies due to various factors, such as rotational speed vibration components due to dimensional errors (manufacturing tolerances, mounting tolerances, etc.) of the crank angle sensor, dynamic errors of the engine per se (eccentric movement, torsion, etc. of the crankshaft), or secondary rotational speed variation components due to the combustion and compression of the engine. Therefore, when such dimensional errors of the angle sensor or dynamic errors of the engine per se are large, or when the engine is in an operating condition where the rotational speed variation components are large, the abnormality determination cannot be accurately performed.

SUMMARY OF THE INVENTION

It is the object of the invention to provide a combustion state-detecting system for internal combustion engines, which is capable of positively determining the combustion state of the engine even when an output from a crank angle sensor varies, to thereby accurately detect an abnormality in the combustion state of the engine.

To attain the above object, the present invention provides a combustion state-detecting system for an internal combustion engine having at least one spark plug, and a crankshaft, comprising:

crank angle signal-generating means for generating a crank angle signal with a predetermined period shorter than a firing period of the spark plug whenever the crankshaft rotates through a predetermined angle;

engine speed-detecting means for detecting a value of rotational speed of the engine whenever the crank angle signal is generated;

first averaging means for continuously averaging values of the rotational speed of the engine detected by the engine speed-detecting means, over a period of one rotation of the crankshaft, to obtain a first average value;

second averaging means for averaging the first average values of the engine rotational speed obtained by the first averaging means, over the firing period of the spark plug, to obtain a second average value;

variation amount-calculating means for calculating an amount of variation in the second average value of the rotational speed of the engine obtained by the second averaging means, over the firing period of the spark plug; and combustion state-determining means for comparing the amount of variation with a predetermined value to determine whether or not the engine is in a degraded state of combustion.

Preferably, the combustion state-detecting system includes filter means for filtering out low frequency components in variation in the second average value of the rotational speed of the engine obtained by the second averaging means, and wherein the variation amount-calculating means calculates the amount of variation in the second average value of the rotational speed of the engine processed by the filter means.

Also preferably, the combustion state-determining means determines that the engine is in the degraded state of combustion when amount of variation shows a larger amount of decrease in the rotational speed of the engine than the predetermined value.

Also preferably, the combustion state-detecting system includes engine load-detecting means for detecting load on the engine, and wherein the predetermined value is set in accordance with the rotational speed of the engine detected by the engine speed-detecting means and the load on the engine detected by the engine load-detecting means.

Further preferably, the combustion state-detecting system includes abnormality-determining means for determining an abnormality in the engine or at least one control system for the engine, based on a result of determination by the combustion state-determining means.

Still further preferably, the engine speed-detecting means detects the rotational speed of the engine based on time intervals of generation of the crank angle signal.

The above objects, features, and advantages of the invention will be more apparent from the following detailed description taken in conjunction with the accompanying drawings.

BRIEF DESCRIPTION OF THE DRAWINGS

FIG. 2(a) and FIG. 2(b) are flowcharts showing programs (main routines) for determining a state of combustion of the engine, in which:

FIG. 2(a) shows a CRK processing which is executed in synchronism with generation of a crank angle (CRK) signal; and FIG. 2(b) shows a TDC processing which is executed in synchronism with generation of a top dead center (TDC) signal;

FIG. 8 is a flowchart showing a subroutine for determining a misfiring rate at a step of the FIG. 2(b) main routine.

DETAILED DESCRIPTION

The invention will now be described in detail with reference to the drawings showing embodiments thereof.

Figure 1:
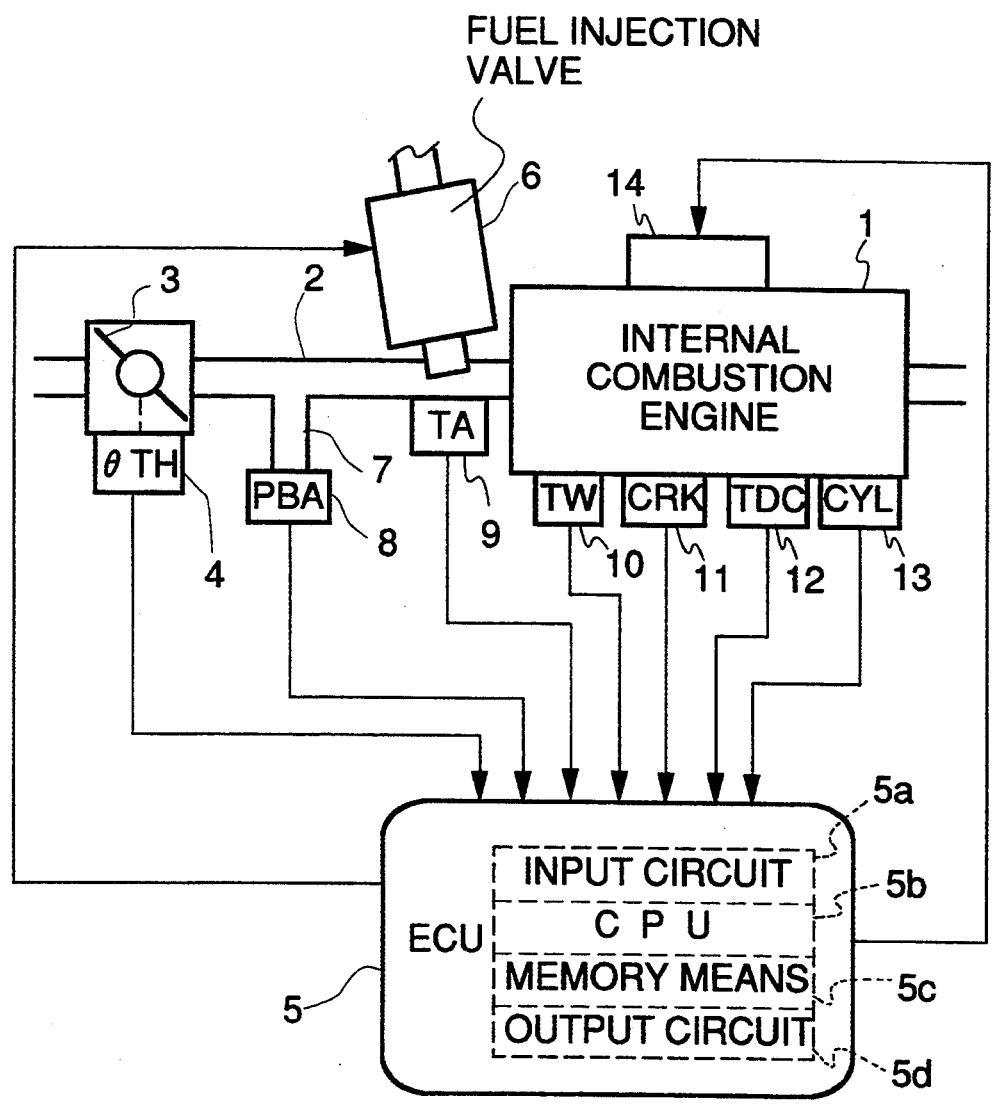
FIG. 1 is a block diagram showing the whole arrangement of an internal combustion engine incorporating a combustion state-detecting system according to an embodiment of the invention.

Referring first to FIG. 1, there is shown the whole arrangement of an internal combustion engine incorporating a combustion state-detecting system according to an embodiment of the invention. In an intake pipe 2 of the engine 1, there is arranged a throttle valve 3, to which is connected a throttle valve opening (θTH) sensor 4 for generating an electric signal indicative of the sensed throttle valve opening and supplying the same to an electronic control unit (hereinafter referred to as "the ECU") 5.

Fuel injection valves 6 are provided for each cylinder and arranged in the intake pipe 2 at a location between the engine 1 and the throttle value 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is provided in communication with the interior of the intake pipe 2 via a conduit 7 at a location immediately downstream of the throttle valve 3 for supplying an electric signal indicative of the sensed absolute pressure to the ECU 5. An intake air temperature (TA) sensor 9 is inserted into the intake pipe 2 at a location downstream of the intake pipe absolute pressure sensor 8 for supplying an electric signal indicative of the sensed intake air temperature TA to the ECU 5.

An engine coolant temperature (TW) sensor 10, which may be formed of a thermistor or the like, is mounted in the cyliner block of the engine 1 for supplying an electric signal indicative of the sensed engine coolant temperature TW to the ECU 5.

A cylinder-discriminating sensor (hereinafter referred to as "the CYL sensor") 13, a top dead point (TDC) sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at predetermined crank angles of a particular cylinder of the engine 1. These sensors 11 to 13 are formed of a magnetic pickup or a pulser. The TDC sensor 12 generates a TDC signal pulse at predetermined crane angles (e.g. whenever the crankshaft rotates through 180 degrees when the engine is of the 4-cylinder type) which corresponds to a predetermined crank angle before a top dead point (TDC) of each cylinder corresponding to the start of the intake stroke of the cylinder. The CRK sensor 11 genrates a pulse (hereinafter referred to as "a CRK signal pulse") at predetermined crank angles (e.g. whenever the crankshaft rotates through 30 degrees) which corresponds to a repetition period shorter than the repetition period of TDC signal pulses. The CYL signal pulse, TDC signal pulse, and CRK signal (crank angle signal) pulse are supplied to the ECU 5.

Arranged in each cylinder of the engine 1 is a spark plug 14, which is electrically connected to the ECU 5.

The ECU 5 comprises an input circuit 5a having the function of shaping the waveforms of input signals from various sensors mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which outputs driving signals to the fuel injection valves 6 and the spark plugs 14.

The CPU 5b operates in response to signals from the above-mentioned sensors to determine operating conditions in which the engine 1 is operating, and calculates, based upon the determined engine operating conditions, a fuel injection time period of each of the fuel injection valves 6 and ignition timing of each of the spark plugs 14, which are energizedin synchronism with TDC signal pulses, to thereby generate driving signals for driving the fuel injection valves 6 and the spark plugs 14 via the output circuit 5d.

Figure 2A:
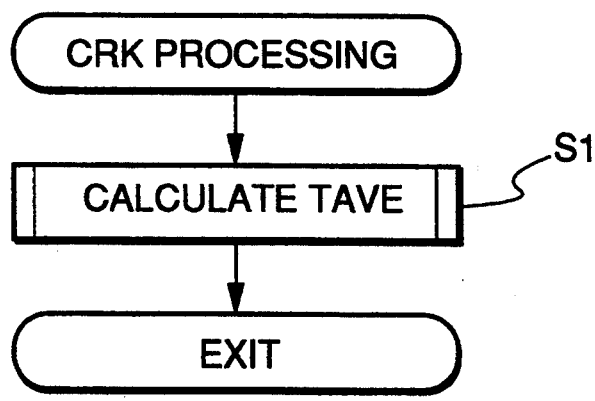
Figure 2B:
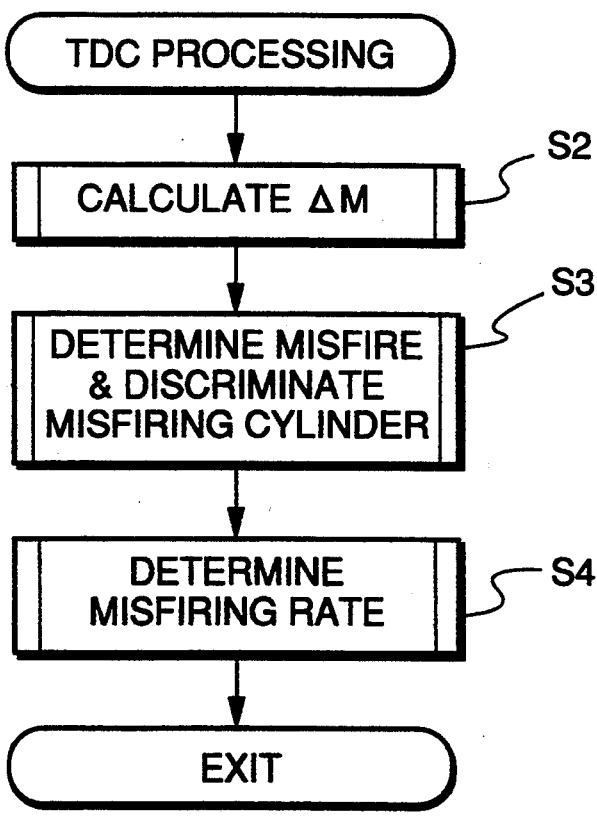

FIG. 2(a) and FIG. 2(b) show main routines which are executed by the CPU 5b for determining a state of combustion of the engine 1.

FIG. 2(a) shows a CRK processing carried out in synchronism with generation of CRK signal pulses. At a step S1 of the program, an average value TAVE (hereinafter referred to as "the first average value") of time intervals of occurrence of CRK signal pulses is calculated. The time intervals are proportional to the reciprocal of the engine rotational speed.

FIG. 2(b) shows a TDC processing carried out in synchronism with generation of TDC signal pulses. At a step S2, an amount of variation ΔM of an average value M (hereinafter referred to as "the second average value") of the first average value TAVE calculated by the CRK processing at the step S1 is calculated. Then, at a step S3, it is determined whether or not a misfire has occurred in the engine 1, based on the amount of variation ΔM of the second average value M, followed by determining whether or not an abnormality exists in the engine at a step S4, based on the number of times of a determination that a misfire has occurred, obtained at the step S3.

Figure 3:
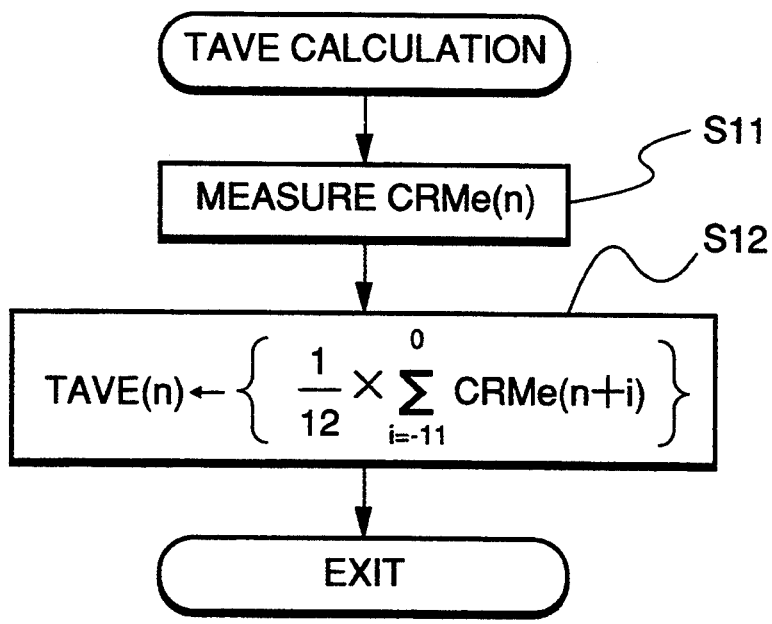
FIG. 3 is a flowchart showing a subroutine for calculating an average value TAVE at a step of the FIG. 2(a) main routine.
Figure 4:
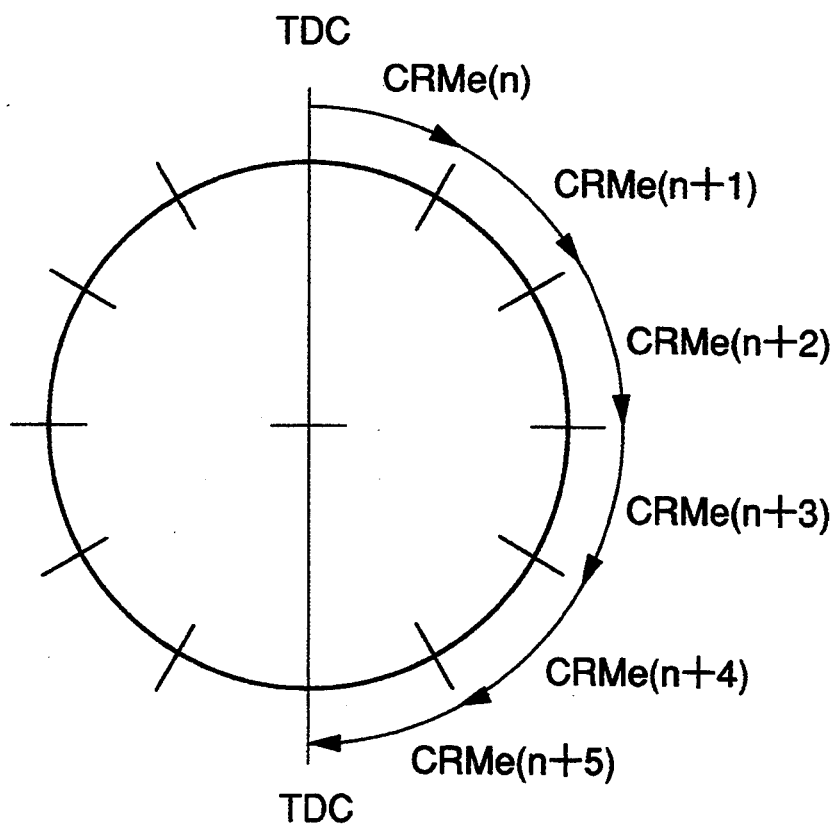
FIG. 4 is a diagram showing the relationship between measuring of parameters indicative of engine rotational speed and the rotational angle of a crankshaft.

FIG. 3 shows a subroutine for calculating the first average value TAVE at the step S1 of the FIG. 2(a) main routine. At a step S11, time intervals CRMe(n) of occurrence of CRK signal pulses are calculated. More specifically, time interval values of CRMe(n), CRMe(n+1), CRMe(n+2) . . . are successively measured whenever the crankshaft rotates through 30 degrees, as shown in FIG. 4.

At a step S12, a first average value TAVE(n) is calculated, which is an average value of 12 CRMe values from a value CRMe(n-11) measured eleven loops before the present loop to a value CRMe(n) in the present loop, by the use of the following equation (1):

$$TAVE(n) = 1/12 \times \sum_{i=-11}^{0} CRMe(n+i) \quad (1)$$

In the present embodiment, since CRK signal pulses are each generated whenever the crankshaft rotates through 30 degrees, the first average value TAVE(n) is an average value obtained over one rotation of the crankshaft. The first average value TAVE(n) obtained by such averaging every period of one rotation of the crankshaft is free of the influence of primary vibration components in engine rotation over a period of one rotation of the engine, i.e. noise components due to dimensional errors (such as manufacturing tolerances and mounting tolerances) of a pulser or a pickup forming the crank angle sensor 11.

The engine rotational speed NE is also calculated based on the TAVE(n) value.

Figure 5:
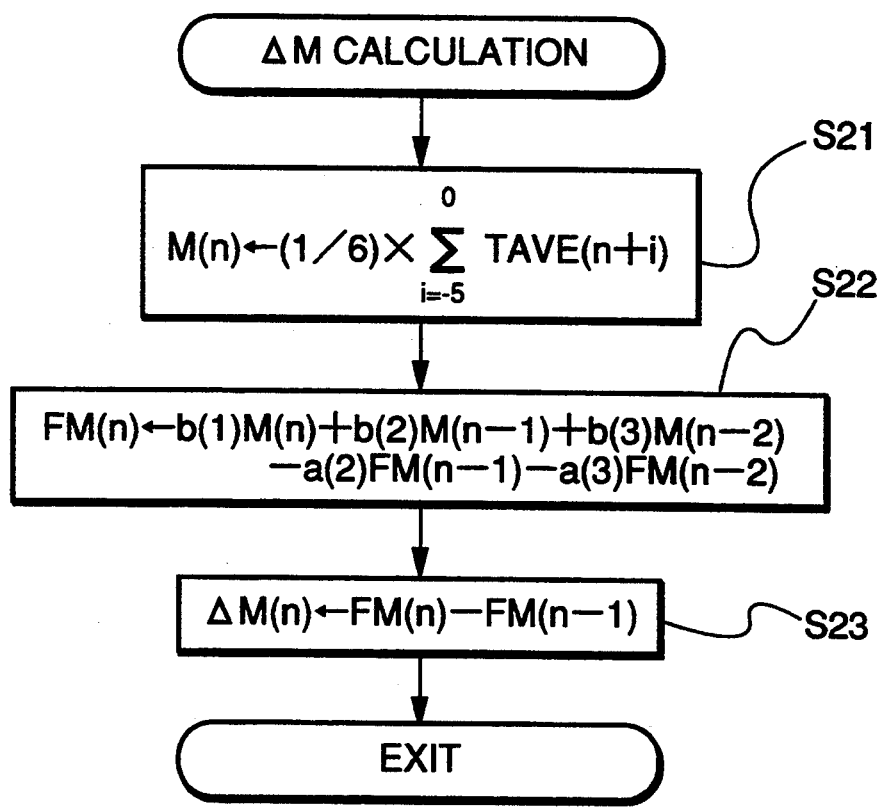
FIG. 5 is a flowchart showing a subroutine for calculating a variation ΔM at a step of the FIG. 2(b) main routine.

FIG. 5 shows a subroutine for calculating the amount of variation $\Delta M$, which is executed at the step S2 of the FIG. 2(b) main routine.

At a step S21, the second average value M(n) is calculated by averaging 6 TAVE values from a value TAVE(n-5) obtained five loops before to a value TAVE(n) in the present loop, by the use of the following equation (2):

$$M(n) = 1/6 \times \sum_{i=-5}^{0} TAVE(n+i) \quad (2)$$

In the present embodiment, the engine 1 is a 4-cylinder/4-cycle engine, wherein spark ignition is carried out at any one of the cylinders whenever the crankshaft rotates through 180 degrees. Therefore, the second average value M(n) is an average value obtained from the first average value TAVE(n) over one firing period. The second average value M(n) obtained by such averaging per ignition cycle is free of secondary vibration components representing a variation in torque of the engine due to combustion, i.e. vibration components in engine rotation over a period of a half rotation of the crankshaft.

At the following step S22, the second average value M(n) thus calculated is subjected to high-pass filtering by the use of the following equation (3), to obtain a high-pass filtered second average value FM(n):

$$FM(n) = b(1) \times M(n) + b(2) \times M(n-1) + b(3) \times M(n-2) - a(2)FM(n-1) - a(3)FM(n-2) \quad (3)$$

where b(1) to b(3), a(2), and a(3) represent filter transmission coefficients, which assume, for example, 0.2096, $-0.4192$, 0.2096, 0.3557, and 0.1940, respectively. In the equation (3), when n in the equation (3) assumes 0 or 1, FM(0) and FM(1) are set to zero, and therefore, the equation (3) is effectively applied when n assumes a value of 2 or more.

The high-pass filtered second average value FM(n) obtained as above is free of frequency components lower than about 10 Hz contained in the M(n) value, which have been removed by the high-pass filtering, to thereby eliminate the adverse effect of vibrations (e.g. vibrations due to torsion of the crankshaft and road surface vibrations transmitted through wheels of a vehicle on which the engine is installed) transmitted from a driving system of the vehicle to the engine.

At a step S23, an amount of variation $\Delta M(n)$ in the high-pass filtered second average value FM(n) is calculated by the use of the following equation (4):

$$\Delta M(n) = FM(n) - FM(n-1) \quad (4)$$

The high-pass filtered second average value FM(n) is inverted in sign from that of the M(n) value. Therefore, when a misfire has occurred in the engine 1, the M(n) value is increased, which in turn causes an increase in the FM(n) value in the negative direction and accordingly an increase in the $\Delta M(n)$ value in the negative direction.

Figure 6:
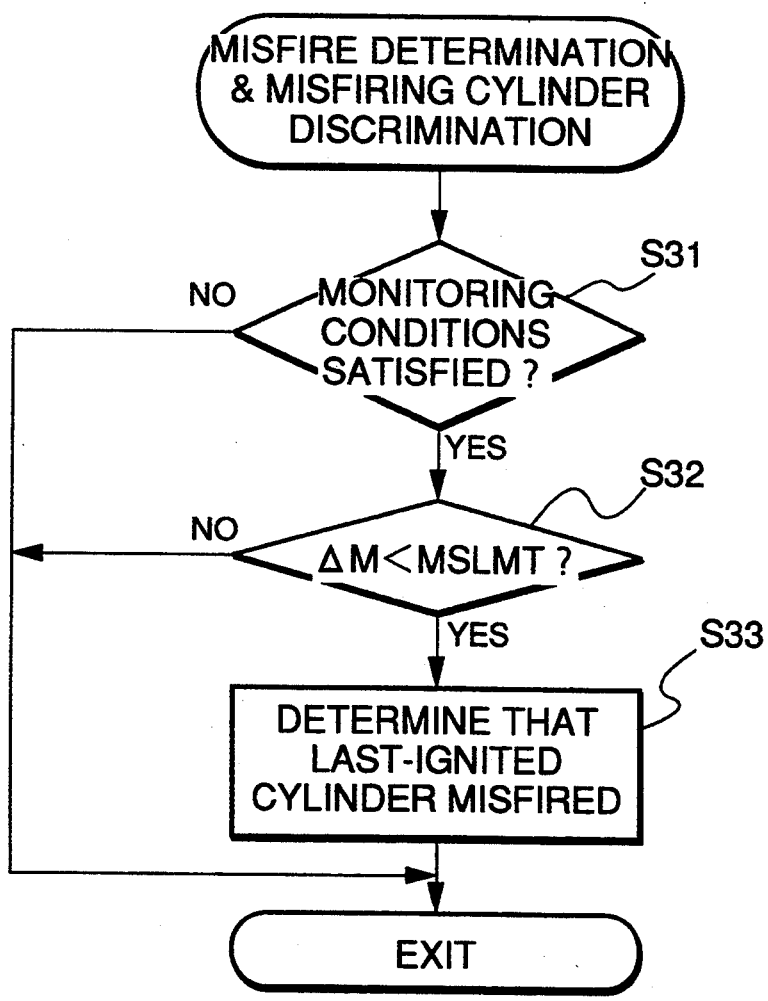
FIG. 6 is a flowchart showing a subroutine for carrying out misfire determination and misfiring cylinder discrimination at a step of the FIG. 2(b) main routine.

FIG. 6 shows a subroutine for carrying out misfire determination and misfiring cylinder discrimination based on the amount of variation $\Delta M$ calculated as above, which is executed at the step S3 of the FIG. 2(b) main routine.

At a step S31, it is determined whether or not monitoring conditions are satisfied, i.e. misfire determination can be carried out. The monitoring conditions are satisfied, for example, when the engine is in a steady operating condition, while at the same time the engine coolant temperature TW, the intake air temperature TA, and the engine rotational speed NE, etc. are all within respective predetermined ranges.

Figure 7:
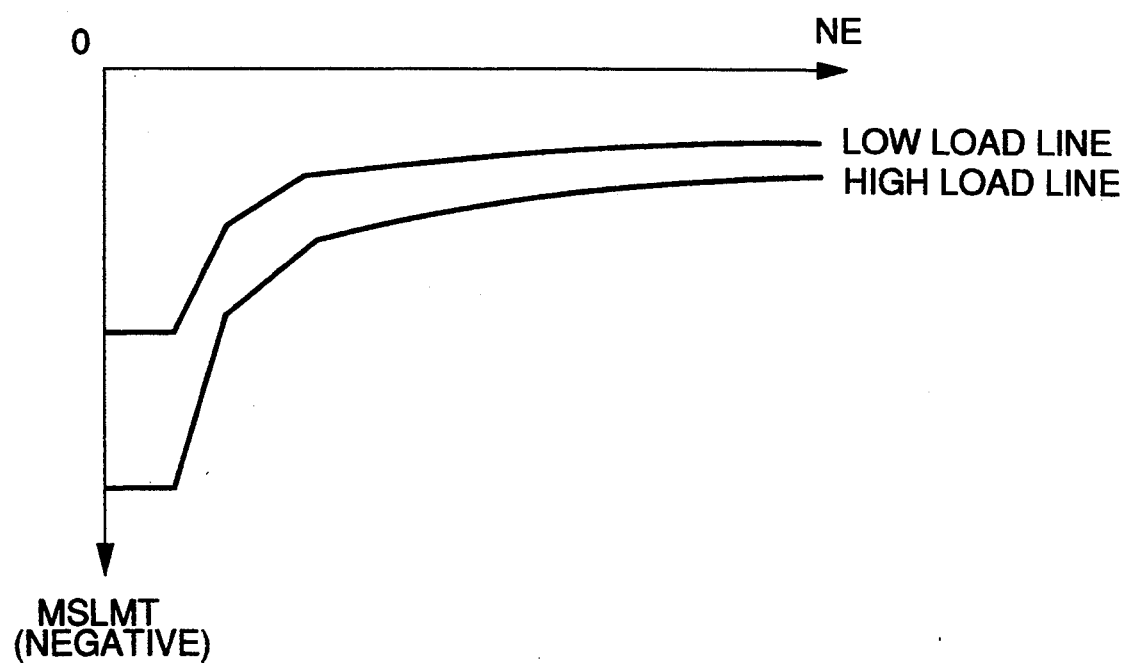
FIG. 7 is a diagram useful in explaining a method of setting a threshold (MSLMT) for misfire determination.

If the monitoring conditions are not satisfied, the program is immediately terminated, whereas if the monitoring conditions are satisfied, it is determined at a step S32 whether or not the amount of variation $\Delta M$ is smaller than a predetermined negative value MSLMT (i.e. whether or not $|\Delta M|$ is larger than $|MSLMT|$). The predetermined negative value MSLMT is read out from a map, as shown in FIG. 7, which is set in accordance with the engine rotational speed NE and the engine load (intake pipe absolute pressure PBA). The absolute value of the MSLMT is set to a smaller value as the engine rotational speed NE increases, and to a larger value as the engine load increases.

If the answer to the question of the step S32 is negative (NO), i.e. if $\Delta M \geq MSLMT$ is satisfied, the present routine is immediately terminated. On the other hand, if the answer at the step SA32 is affirmative (YES), i.e. if $\Delta M < MSLMT$ is satisfied, it is determined that a misfire has occurred in the cylinder where spark ignition took place in the last cycle, because the $\Delta M(n)$ value increases in the negative direction when a misfire has occurred.

In addition, the reason why it is determined that a misfire has occurred in the last-ignited cylinder is that the high-pass filtering causes a delay in obtaining the second average value FM(n).

The high-pass filtering may be omitted. Then, the second average value M(n) may be directly used to calculate the amount of variation $\Delta M(n)$, and hence no inversion of the sign of the $\Delta M$ value occurs. Therefore, the predetermined value MSLMT for determining misfiring in this alternative case is set to a positive value, which is obtained by inverting the setting of the map in FIG. 7. Then, the absolute value of MSLMT is set in the same manner as in FIG. 7. In this alternative case, it is determined at the step S33 that a misfire has occurred in the cylinder where a misfire has taken place in the present cycle, because no delay due to high-pass filtering processing has occurred.

As described hereinabove, according to the present embodiment, the time intervals of occurrence of CRK signal pulses are measured, followed by continuously averaging the resulting measured values CRMe over a period of one rotation of the crankshaft, to thereby calculate the first average value TAVE. Further, the TAVE values are averaged over every repetition period of ignition, to thereby calculate the second average value M(n). The misfire determination is carried out based on the amount of variation ΔM in the second average value M(n), to thereby eliminate the adverse effect of dimensional error components such as mounting tolerances of the crank angle sensor and combustion variation components, upon the misfire determination. As a result, stable misfire determination can be achieved, resulting in improved accuracy in the detection of a misfire.

FIG. 8 shows a subroutine for determining a misfiring rate, which is executed at the step AS4 of the FIG. 2b main routine.

At a step S41, it is determined whether or not the variation amount (ΔM) has continuously been measured over 200 rotations of the crankshaft after a counter A to be reset at a subsequent step S46, referred to hereinafter, was rest. If the answer to the question of the step S41 is negative (NO), the program is immediately terminated. The counter A counts the number of times of a misfire determination that a misfire occurred in the last cylinder at the step S33 in the FIG. 6 subroutine.

On the other hand, the variation amount (ΔM) has continuously been measured over 200 rotations of the crankshaft, i.e. if the answer to the question of the step S41 is affirmative (YES), an NG-determined misfiring TDC signal pulse number MFTDCCAT is retrieved from an MFTDCCAT map at a step SA42. The NG-determined misfiring TDC signal pulse number MFTDCCAT is a threshold value to be used for a determination at the next step S43. The MFTDCCAT map is set in accordance with the engine rotational speed NE and the intake pipe absolute pressure PBA, such that the MFTDCCAT value is set to a smaller value as the NE value increases or as the PBA value increases.

At the following step S43, it is determined whether or not the count value of the counter A is equal to or more than the threshold value MFTDCCAT. If the answer to the question of the step S43 is affirmative (YES), the program proceeds to a step S44, where it is determined that an abnormality exists. On the other hand, if the answer at the step S43 is negative (NO), it is determined at a step SA45 that the engine is in a normal condition. Then, the counter A is reset at the step S46, followed by terminating the present routine.

Thus, when the number of times of the misfire determination exceeds a predetermined value, an abnormality is determined to exist in the engine or a control system therefor such as the ignition system and the fuel supply system.

What is claimed is:

1. A combustion state-detecting system for an internal combustion engine having at least one spark plug, and a crankshaft, comprising:

crank angle signal-generating means for generating a crank angle signal with a predetermined period shorter than a firing period of said spark plug whenever said crankshaft rotates through a predetermined angle;

engine speed-detecting means for detecting a value of rotational speed of said engine whenever said crank angle signal is generated;

first averaging means for continuously averaging values of the rotational speed of said engine detected by said engine speed-detecting means, over a period of one rotation of said crankshaft, to obtain a first average value;

second averaging means for averaging said first average values of the engine rotational speed obtained by said first averaging means, over said firing period of said spark plug, to obtain a second average value;

variation amount-calculating means for calculating an amount of variation in said second average value of the rotational speed of said engine obtained by said second averaging means, over said firing period of said spark plug; and combustion state-determining means for comparing said amount of variation with a predetermined value to determine whether said engine is in a degraded state of combustion.

2. A combustion state-detecting system as claimed in claim 1, including filter means for filtering out low frequency components in variation in said second average value of the rotational speed of said engine obtained by said second averaging means, and wherein said variation amount-calculating means calculates the amount of variation in said second average value of the rotational speed of said engine processed by said filter means.

3. A combustion state-detecting system as claimed in claim 1 or 2, wherein said combustion state-determining means determines that said engine is in said degraded state of combustion when the amount of variation shows a larger amount of decrease in the rotational speed of said engine than said predetermined value.

4. A combustion state-detecting system as claimed in claim 1 or 2, including engine load-detecting means for detecting load on said engine, and wherein said predetermined value is set in accordance with the rotational speed of said engine detected by said engine speed-detecting means and said load on said engine detected by said engine load-detecting means.

5. A combustion state-detecting system as claimed in claim 1 or 2, including abnormality-determining means for determining an abnormality in said engine or at least one control system for said engine, based on a result of determination by said combustion state-determining means.

6. A combustion state-detecting system as claimed in claim 1 or 2, wherein said engine speed-detecting means detects the rotational speed of said engine based on time intervals of generation of said crank angle signal.

* * * * *